United States Patent
Ishikawa

(10) Patent No.: US 6,483,508 B1
(45) Date of Patent: Nov. 19, 2002

(54) INFORMATION PROCESSING APPARATUS AND METHOD, AND PROVIDING MEDIUM

(75) Inventor: Masayuki Ishikawa, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/205,936

(22) Filed: Dec. 4, 1998

(30) Foreign Application Priority Data

Dec. 5, 1997 (JP) .............................................. 9-352232

(51) Int. Cl.⁷ .............................................. G06T 17/00
(52) U.S. Cl. ........................ 345/420; 345/853; 345/961
(58) Field of Search ................................ 345/420, 419, 345/853, 961

(56) References Cited

U.S. PATENT DOCUMENTS 6,105,036 A * 8/2000 Henckel ..................... 707/104
6,169,545 B1 * 1/2001 Galley et al. ............... 345/333
6,281,900 B1   8/2001 Ishikawa

* cited by examiner

*Primary Examiner*—Mark Zimmerman
*Assistant Examiner*—Lance W. Sealey
(74) *Attorney, Agent, or Firm*—Oblon, Spivak, McClelland, Maier & Neustadt, P.C.

(57) ABSTRACT

The invention provides an information processing apparatus and method and a providing medium by which editing of a prototype can be performed readily. When a prototype is defined using some of nodes of a current scope, if the current scope includes a node which should be routed to the prototype, then an editing tool adds an interface as a field for inputting or outputting an event therethrough to the prototype, and routes between the node and the prototype through the thus added interface.

5 Claims, 19 Drawing Sheets

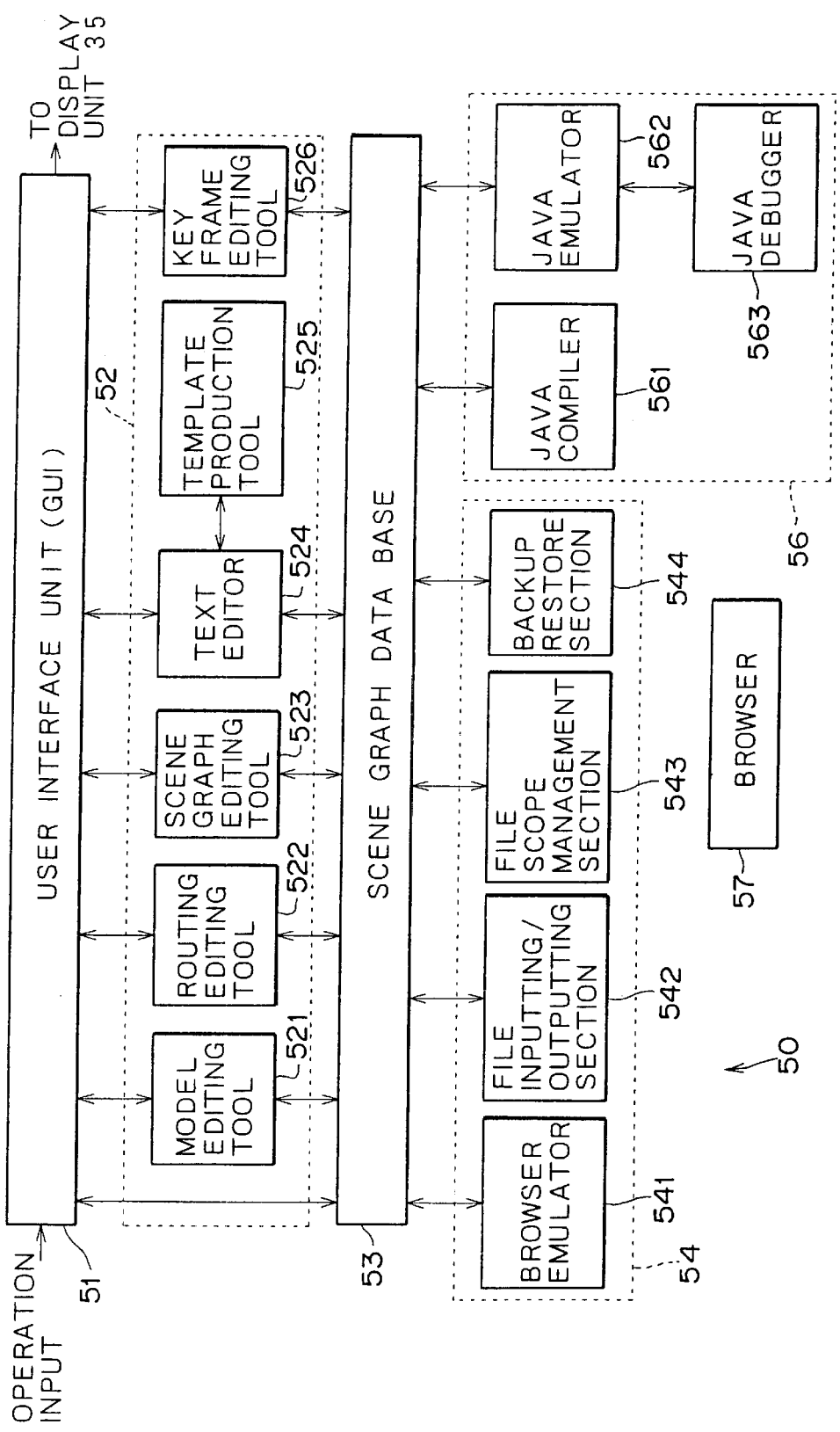

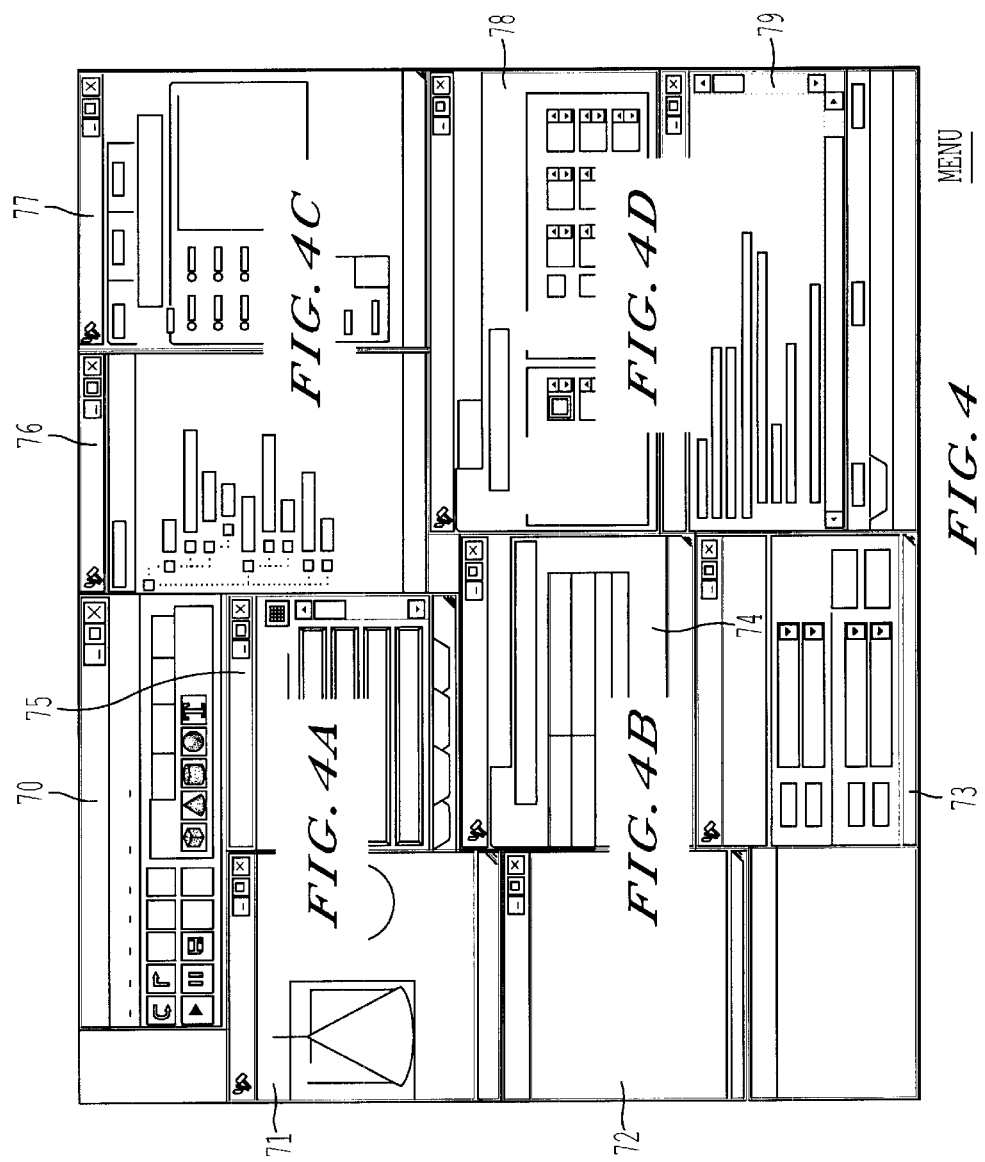

INFORMATION PROCESSING APPARATUS AND METHOD, AND PROVIDING MEDIUM

BACKGROUND OF THE INVENTION

This invention relates to an information processing apparatus and method and a providing medium, and more particularly to an information processing apparatus and method and a providing medium by which, especially when a new node is defined as a prototype using some or all of nodes which form a predetermined world and a node which should be routed to the defined prototype is present, an interface is automatically added to the defined prototype.

It is known that, in the Internet which is a computer network built up in a worldwide scale, the VRML (Virtual Reality Modeling Language) is commonly used as a describing language by which three-dimensional information can be handled uniformly making use of a framework of the WWW (World Wide Web) which provides various information.

As an information providing system which can be used on the Internet, the WWW developed by the CERN (European Center for Nuclear Research) of Switzerland is known. The WWW allows browsing of information of a text, an image, sound and so forth in the form of a hypertext, and asynchronously transfers information stored in a WWW server to a terminal such as a personal computer in accordance with a protocol called HTTP (Hyper Text Transfer Protocol).

A WWW server is composed of the HTTP, server software called daemon and HTML files in which hypertext information is stored. It is to be noted that the daemon is a background program for executing management and process when operation is performed on the UNIX. The hypertext information is represented using a describing language called HTML (HyperText Markup Language). In a description of a hypertext by the HTML, a logical structure of a sentence is represented by a format designation called tag placed between "<" and ">". Description of a link to other information is performed using link information called anchor. In order to designate a location where information is present using the anchor, a character train called URL (Uniform Resource Locator) is used.

The protocol to be used for transfer a file described in the HTML is the HTTP. The HTTP has a function of transmitting a request for information from a client to a WWW server and transferring hypertext information of an HTML file to the client.

The WWW browser is used frequently for an environment in which the WWW is utilized. The WWW browser is the client software such as the Netscape Navigator (trademark of Netscape Communications, a company of United States). The WWW browser can be used to browse files so called homepages on WWW servers on the Internet, which are spread in a worldwide scale and conform to the URL, and allows accessing to various information sources of the WWW by successively tracing homepages between which a link is extended like so-called net surfing.

In recent years, specifications of a three-dimensional graphics describing language called VRML which further expands the WWW to allow description of a three-dimensional imaginary space or setting of a link of a hypertext to an object drawn in three-dimensional graphics so that WWW servers can be successively accessed tracing such links have been developed, and a VRML browser for displaying a three-dimensional space described based on the specifications of the VRML has been developed.

Details of the VRML are disclosed in such documents as, for example, Mark Pesce, "VRML: Browsing & Building Cyberspace", 1995 New Readers Publishing ISBN 1-56205-498-8; Koichi Matsuda and Yasuaki Honda, "Latest Trend of VRML and CyberPassage", Kyoritsu Publishing, 1996, Vol. 28, No. 7, pp. 29–36, No. 8, pp. 57–65, No. 9, pp. 29–36 and No. 10, pp. 49–58, and so forth.

Further, the official and complete specifications of "The Virtual Reality Modeling Language Version 2.0, ISO/IEC CD 14772" are laid open in "http://www.vrml.org/Specifications/VRML 2.0/FINAL/spec/index.html", and the Japanese version of the same is disclosed in "http://www.webcity.co.jp/info/andoh/VRML/vrm12.0/spec-jp/index.html".

Further, for example, software for a browser for the VRML 2.0 and a shared server called "Community Place (trade mark) Browser/Bureau" has been developed and put on the market by the applicant of the present patent application, Sony Corporation, and the β version (temporary provision version) of the above software can be downloaded from the home page http://vs.sgny co.jp through the Internet.

With the VRML 2.0 described above, it is possible to describe and represent an autonomous behavior of an object in a three-dimensional imaginary space. If it is tried to produce VRML contents using VRML 2.0 with which an object moves around dynamically in a three-dimensional imaginary space, the following operation process is followed. It is to be noted that, in the following description, an aggregate of VRML files, script files and so forth for realizing a series of behaviors of an object in an imaginary space is called VRML contents.

In the following, a series of operations for producing such VRML contents is described.

A model production operation is an operation of describing a shape, a position and so forth of an object (model) to be arranged in an imaginary space in accordance with the VRML 2.0 to produce a basic VRML file.

Description of a sensor node is an operation of adding to a VRML file a description of a sensor node such ads TouchSensor which generates an event when a click operation (pointing operation) by a mouse is performed to any objects in an imaginary space, TimeSensor which generates an event when a preset time comes or the like.

An editing operation of routing is an operation of adding to a VRML file a description of routing for transmitting an event generated in response to a pointing operation to an object to which a sensor node is added or the like.

Description of a script node is an operation of adding to a VRML file a description regarding a script node for delivering an event transmitted by routing to an external script.

Production of a script file is an operation of describing (programming) a script with the Java language (Java is a trademark of Sun Microsystems of the United States) for realizing a behavior set in advance to each object in an imaginary space based on an event transmitted through a script node.

Desired VRML contents are produced through such various operations as described above.

If it is tried to produce VRML contents which involve autonomous behaviors of an object in an imaginary space based on the VRML 2.0, existing authoring software (for example, the 3D Studio Max (trademark) or the like) called modeler is used to produce a shape or animation of the object, and the shape or animation thus produced is outputted as a file of the format of the VRML 2.0. If the modeler does not support the format of the VRML 2.0, then it is necessary to use a converter or the like to convert the produced file into a file of the format of the VRML 2.0.

Then, such operations as to add descriptions of various sensor nodes and so forth prescribed by the VRML 2.0 to a VRML file using a text editor, production of a script with the Java language, addition of a corresponding script node to the script, addition of a route sentence and so forth are repeated. Then, finally upon confirmation of actual operation, a VRML browser conforming to the VRML 2.0 is started and the operations of the object are confirmed by click operations of a mouse and so forth.

By the way, according to the VRML 2.0, a user can define and expand a new node type and can use the defined node as if it were an existing incorporated node. A method wherein a user defines a new node in this manner is called prototype (ProtoType). When the prototype is defined, a keyword named PROTO is used.

However, authoring systems of the VRML 2.0 little support editing of the prototype and accordingly have a subject in that, when a new node is to be defined as a prototype, the process such as setting of an input/output of routing must be performed by manual operation.

SUMMARY OF THE INVENTION

It is an object of the present invention to provide an information processing apparatus and method and a providing medium by which editing of a prototype can be performed readily.

In order to attain the object described above, according to an aspect of the present invention, there is provided an information processing apparatus which hierarchically displays nodes, which form a world, as a current scope and defines a new node as a prototype using some or all of the nodes of the hierarchically displayed current scope. The appratus comprises addition means for adding, when the prototype is defined using some of the nodes of the current scope, if the current scope includes a node which should be routed to the prototype, an interface as a field for inputting or outputting an event therethrough to the prototype, and routing means for routing the node and the prototype through the interface added by the addition means.

According to another aspect of the present invention, there is provided an information processing method wherein nodes which form a world are hierarchically displayed as a current scope and a new node is defined as a prototype using some or all of the nodes of the hierarchically displayed current scope. The method comprises an addition step of adding, when the prototype is defined using some of the nodes of the current scope, if the current scope includes a node which should be routed to the prototype, an interface as a field for inputting or outputting an event therethrough to the prototype, and a routing step of routing the node and the prototype through the interface added by the addition step.

According to a further aspect of the present invention, there is provided a providing medium for providing a computer program which can be read and executed by an information processing apparatus, which hierarchically displays nodes, which form a world, as a current scope and defines a new node as a prototype using some or all of the nodes of the hierarchically displayed current scope, to execute an addition step of adding, when the prototype is defined using some of the nodes of the current scope, if the current scope includes a node which should be routed to the prototype, an interface as a field for inputting or outputting an event therethrough to the prototype, and a routing step of routing the node and the prototype through the interface added by the addition step.

With the information processing apparatus, the information processing method and the providing medium described above, when a prototype is defined using some of nodes of a current scope, if the current scope includes a node which should be routed to the prototype, an interface as a field for inputting or outputting an event therethrough is added to the prototype, and the node and the prototype are routed therebetween through the thus added interface. Consequently, editing of the prototype can be performed readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a block diagram showing an example of a construction of a contents producing tool which operates in the client terminal 5 shown in FIGS. 1 and 2;

DESCRIPTION OF THE PREFERRED EMBODIMENT

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses following them. However, this description provides a mere example and does-not signify that the features of the present invention be limited to the recited elements.

According to the present invention as set forth in claim 1, an information processing apparatus comprises addition means (for example, a step S15 of FIG. 7) for adding, when a prototype is defined using some of nodes of a current scope, if the current scope includes a node which should be routed to the prototype, an interface as a field for inputting or outputting an event therethrough to the prototype, and routing means (for example, a step S16 of FIG. 7) for routing the node and the prototype through the interface added by the addition means.

According to the present invention as set forth in claim 2, the information processing apparatus further comprises creation means (for example, a step S24 of FIG. 13) for creating an instance which is a substance of the prototype, second addition means (for example, a step S25 of FIG. 13) for adding an interface to the instance when the current scope includes a node which is to be routed to the instance created by the creation means, and second routing means (for example, a step S26 of FIG. 13) for routing between the node and the instance through the interface added by the second addition means.

Figure 1:
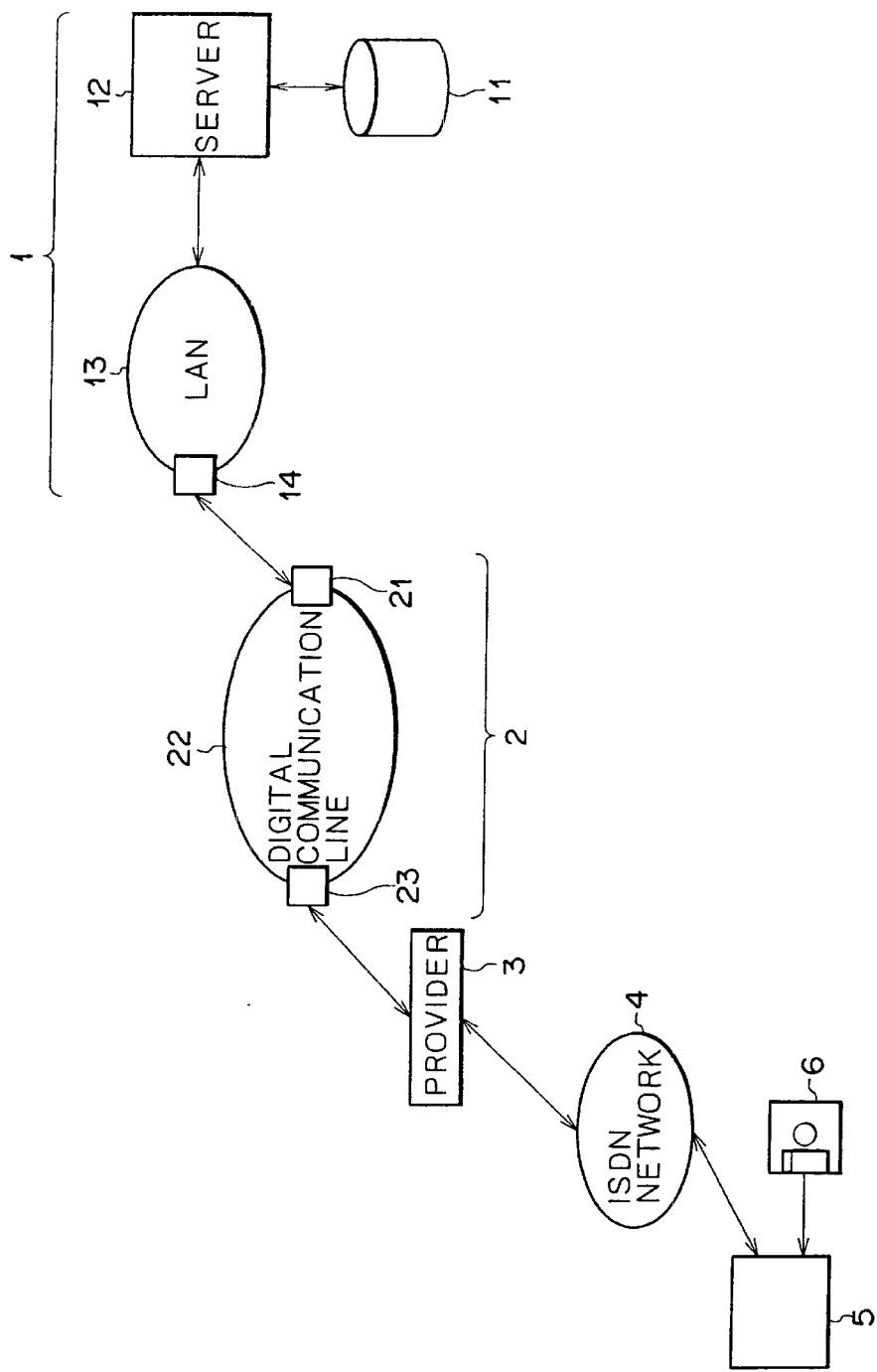
FIG. 1 is a diagrammatic view showing an example of a construction of a network system which uniformly handles an information representing a three-dimensional imaginary space.

Referring to FIG. 1, there is shown a construction of a network system which uniformly handles a three-dimensional space and to which an information processing apparatus of the present invention is applied. The network system shown includes, as principal components, a private network 1, the Internet 2, a provider 3, an integrated services digital network (ISDN network) 4, and a client terminal 5 connected to each other. It is to be noted that, while the network system can actually include a plurality of private networks, internets, providers and client terminals, it is shown in FIG. 1 that the number of each of the components is only one for simplified illustration and description. In the network system shown in FIG. 1, data communication between a server 12 of the private network 1 and the client terminal 5 is realized by a local area network (LAN) 13 of the private network 1, a digital communication line 22 of the Internet 2, the provider 3 and the ISDN network 4.

The private network 1 includes a server 12 having a hard disc 11, a LAN 13, and a gateway server 14. The server 12 is, for example, a server for Community Place (trademark) provided on the Internet (http://vs.sony.co.jp/) by the assignee of the present patent application, and is constructed such that it acquires contents produced by a user using a contents production tool 50 (which will be hereinafter described with reference to FIG. 3), in short, graphics data (a VRML file) indicating a shape, a position and so forth of a three-dimensional object (model) described by the VRML 2.0, and a script (VRML contents composed of a file or the like) which is described with a program language such as the Java language by the user through the network or the like and stores and manages the contents onto and on the local hard disc 11.

Further, the server 12 transfers, in response to a request for transfers from the client terminal 5, contents of a three-dimensional imaginary space stored on the hard disc 11 to the client terminal 5 of the source of the request through the LAN 13, Internet 2, provider 3 and ISDN network 4 (such communication nodes in the network system are generally and suitably referred to simply as network). Further, the server 12 transfers a program for production of contents (the contents production tool 50 which will be hereinafter described with reference to FIG. 3) to the client terminal 5 through the network or a recording medium 6 such as, for example, a floppy disk.

The Internet 2 includes routers 21 and 23, and a digital communication line 22.

Figure 2:
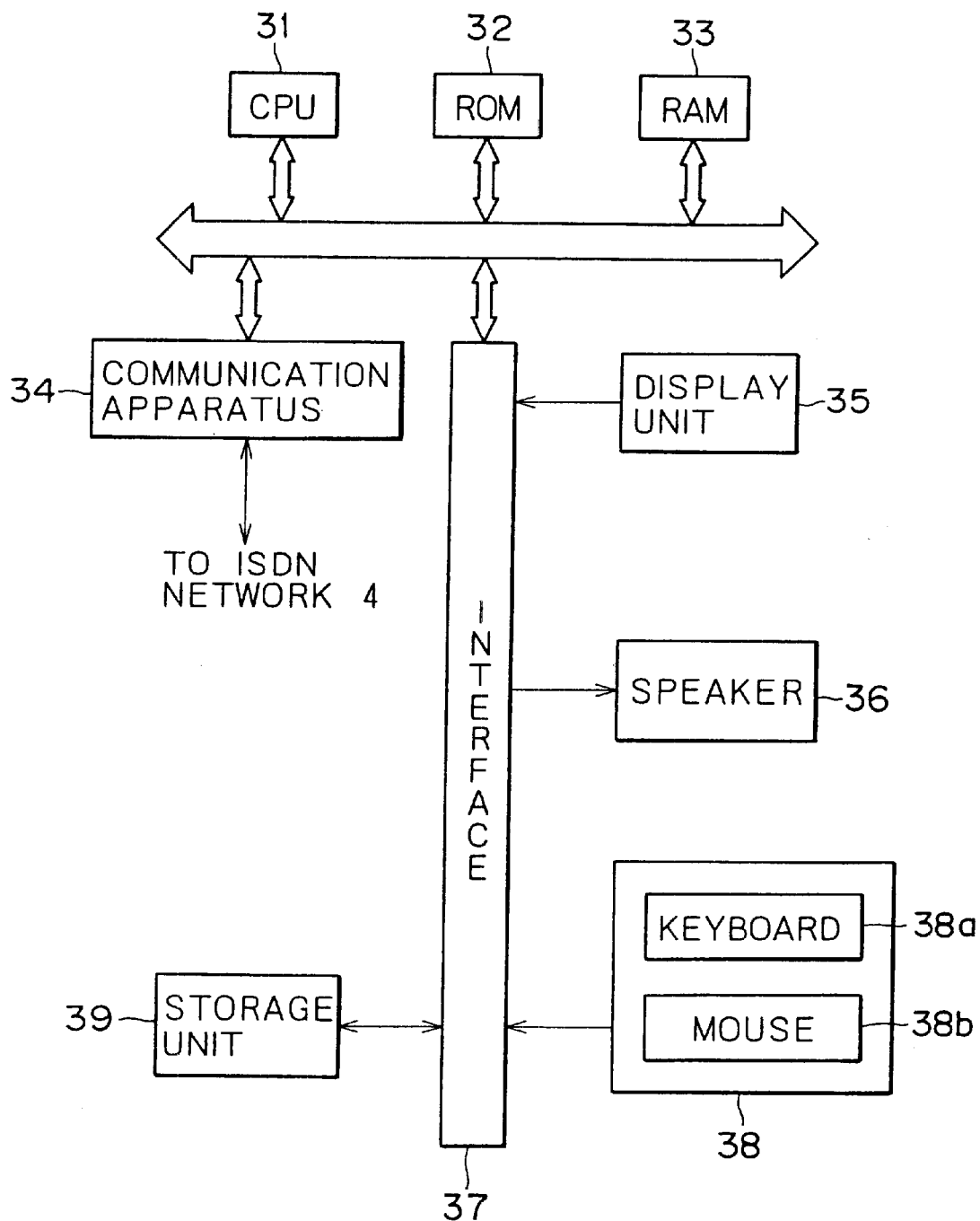
FIG. 2 is a block diagram showing an example of a construction of a client terminal shown in FIG. 1.
Figure 4A:
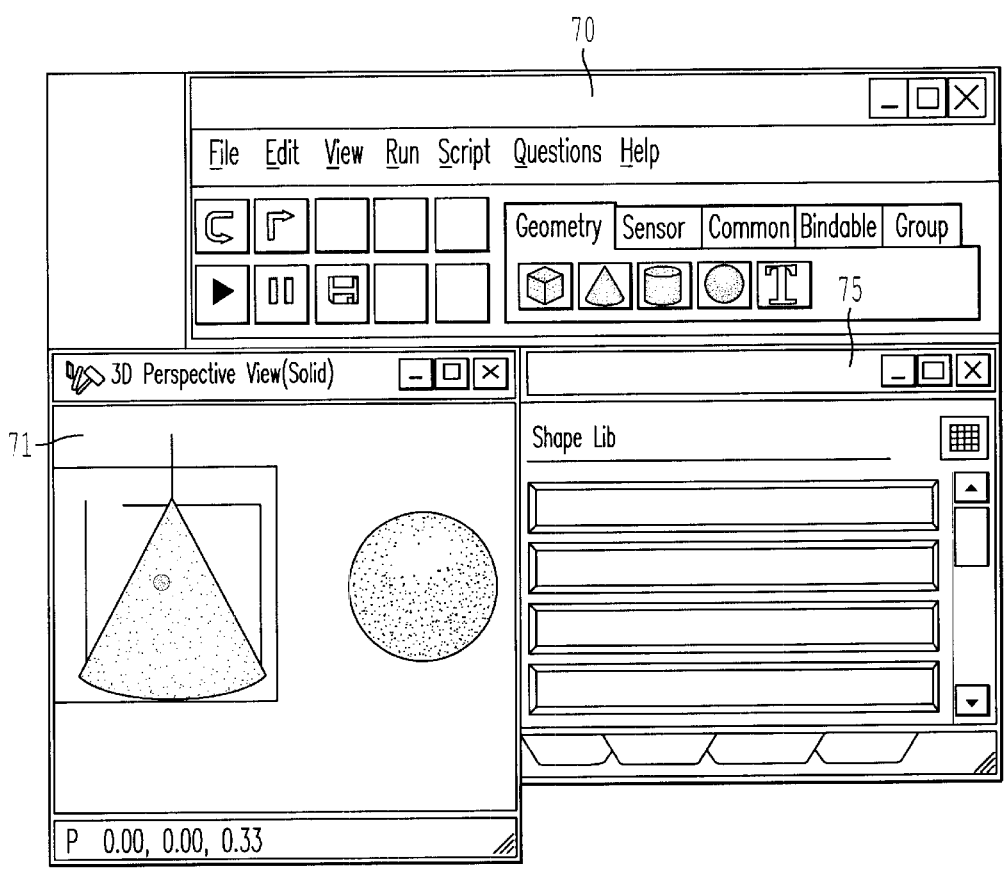
FIG. 4 is a photograph of a half tone image showing a menu screen displayed on a display unit by the contents producing tool shown in FIG. 3.
Figure 4B:
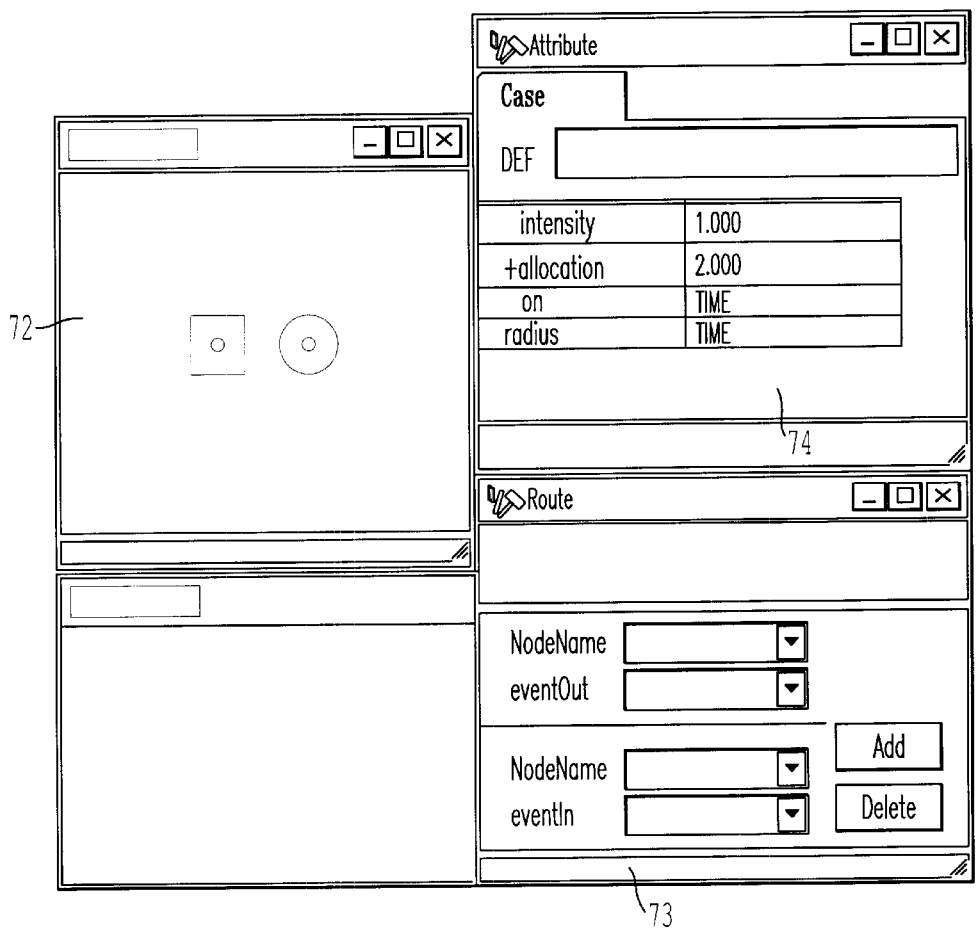
Figure 4C:
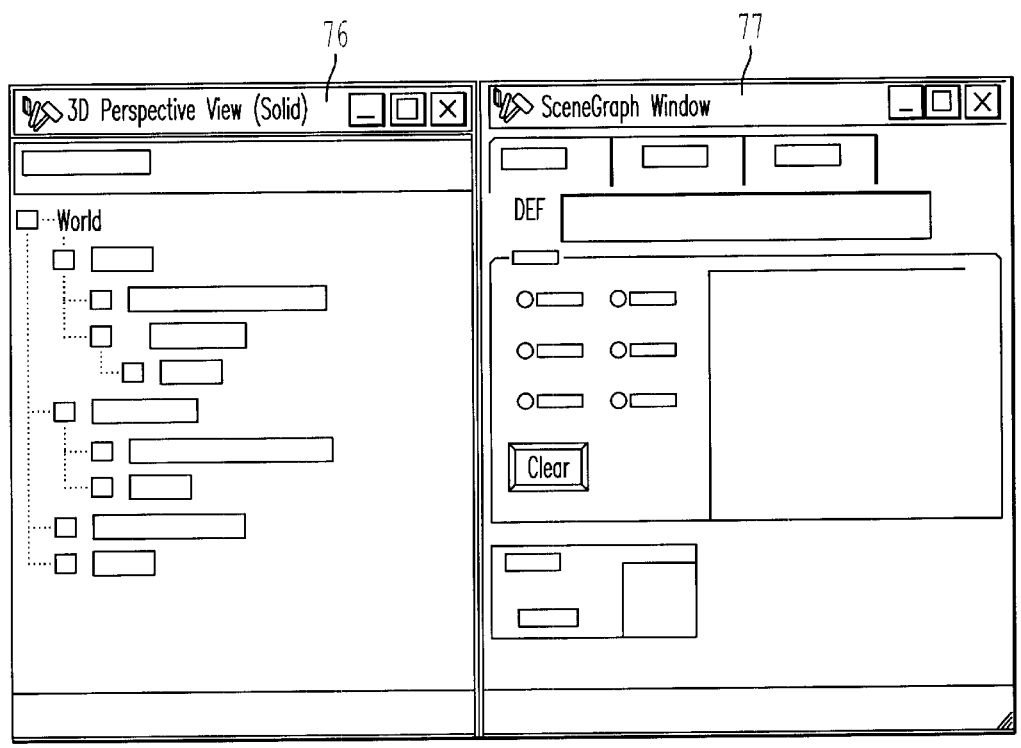
Figure 4D:
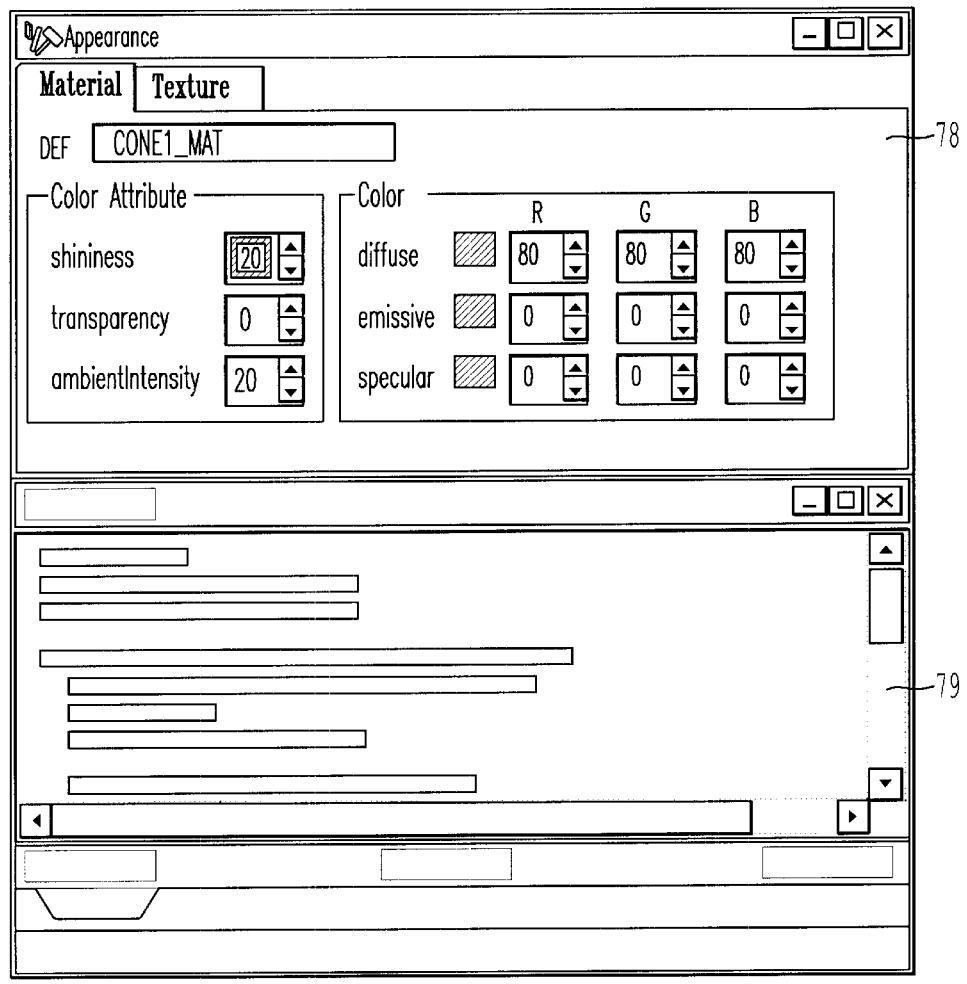

FIG. 2 shows an example of a construction of the client terminal 5 of FIG. 1. Referring to FIG. 2, the client terminal 5 shown includes a CPU 31 which executes various processes in accordance with a program stored in a ROM 32. A RAM 33 suitably stores data, a program and so forth necessary for the CPU 31 to execute various processes. A communication apparatus 34 supplies and receives data through the ISDN network 4.

A display unit 35 includes, for example, a CRT, an LCD or the like and can display a three-dimensional image or the like of CG (computer graphics). A speaker 36 outputs a sound signal. A keyboard 38a of an inputting apparatus 38 is operated to input predetermined characters, symbols and so forth, and a mouse 38b is operated to point at a predetermined position (for example, a model). A storage unit 39 which is formed from, for example, a hard disc, an optical disc, an MO disc or a floppy disc stores a contents production tool 50 and various data. An interface 37 forms an interface of data with the display unit 35, speaker 36, inputting apparatus 38 and storage unit 39.

The client terminal 5 receives, through the communication apparatus 34, VRML contents downloaded from the server 12 of FIG. 1 through the network and causes the display unit 35 to display them.

Further, the client terminal 5 installs the contents production tool 50 supplied from the server 12 through the network or the recording medium 6 into the storage unit 39, starts the contents production tool 50 in response to an operation of the user to produce contents of a three-dimensional imaginary space, and uploads the produced VRML contents to the server 12 through the network or the recording medium 6.

Furthermore, the client terminal 5 starts, in response to a pointing operation to a displayed model using the inputting apparatus 38 by the user or the like, for example, a script for changing the color of the pointed model, for moving the model or the like to vary the contents of the display of the three-dimensional imaginary space.

In short, by varying the contents of the display interactively in response to an operation of the user for a model of a three-dimensional imaginary space, the client terminal 5 causes the user to have such a feeling that the user itself moves or the user touches with and operates the model to move it or generate sounds.

FIG. 3 shows an example of a construction of the contents production tool 50 which operates in the client terminal 5 shown in FIGS. 1 and 2. Referring to FIG. 3, the contents production tool 50 includes a user interface unit (GUI: Graphical User Interface) 51, an editing tool 52, a scene graph database 53, a working tool 54, a script production section 56, and a browser 57.

The editing tool 52 includes a model editing tool 521, ad routing editing tool 522, a scene graph editing tool 523, a text editor 524, a template production tool 525 and a key frame editing tool 526. The working tool 54 includes a browser emulator 541, a file inputting/outputting section 542, a file scope management section 543, and a backup restore section 544. The script production section 56 includes a Java compiler 561, a Java emulator 562, and a Java debugger 563.

The contents production tool 50 is software to be installed into the storage unit 39 of and used by the client terminal 5 of FIG. 2, and is distributed through the network or the recording medium 6 and uniformly coordinates a model production operation and an interaction production operation with each other to perform production of contents.

In the following, the components of the contents production tool 50 are described.

The user interface unit 51 shown in FIG. 3 displays an image, which is used for inputting of various data to be used for production of contents of a three-dimensional imaginary space, on the display unit 35 of FIG. 2 using the form of a window. Further, the user interface unit 51 accepts operation input data inputted when the user operates various buttons in a window displayed on the display unit 35 using the mouse 38b of the inputting apparatus 38 or operation input data inputted from the keyboard 38a, and supplies necessary data to each required tool of the editing tool 52 or the scene graph database 53. In short, the user interface unit 51 provides a GUI environment to the user.

Further, the user interface unit 51 receives display output data from the editing tool 52 or the scene graph database 53 and displays it in the image in a predetermined window of the display unit 35. It is to be noted that the components of the editing tool 52, the scene graph database 53 and the working tool 54 are started in response to operation input data inputted to the user interface unit 51 and performs the process based on the operation input data supplied from the user interface unit 51.

The editing tool 52 provides functions necessary for production of graphics data of a model in a three-dimensional image space and an interaction program to a user. In the editing tool 52, the model editing tool 521 produces graphics data indicative of attributes of a model such as a color (shape), a position and a movement using data for production of a model inputted by an operation of the user in a model editing window displayed on the display unit 35. Further, the model editing tool 521 outputs produced graphics data (attributes of a model) to the scene graph database 53. Furthermore, the model editing tool 521 displays produced graphics data three-dimensionally or two-dimensionally at a predetermined position of a model editing window on the display unit 35 through the user interface unit 51.

It is to be noted that the model editing tool 521 can possibly edit graphics data stored in the storage unit 39, graphics data read out from the recording medium 6 or graphics data provided through the network.

Figure 9A:
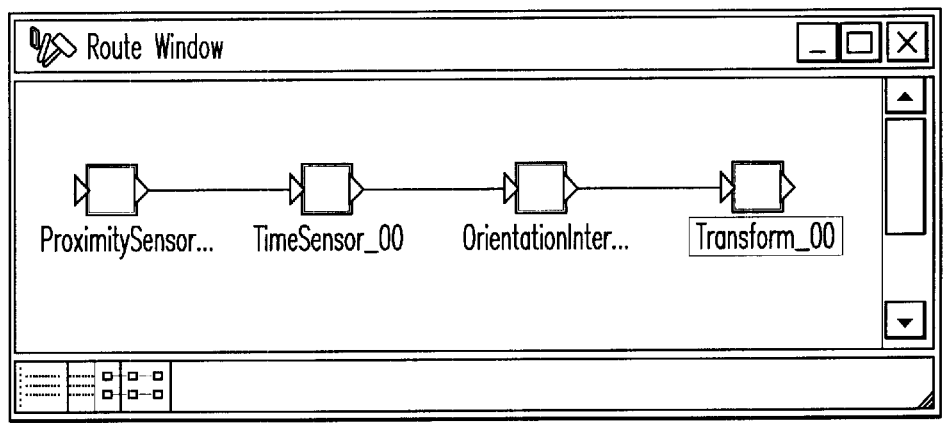
FIGS. 9A and 9B are photographs of a half tone image showing examples wherein the route window of FIG. 6 is displayed on the display unit.
Figure 9B:
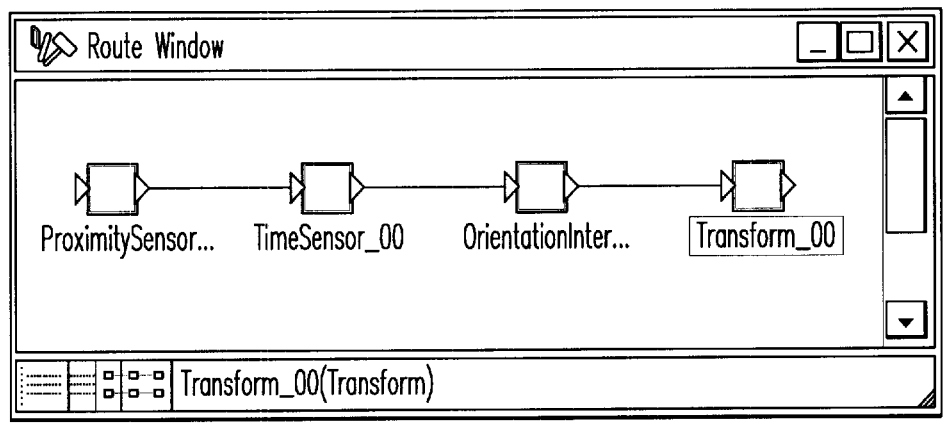

The routing editing tool 522 executes routing editing of coordinating graphics data of models having names applied thereto in a scope (VRML file which makes an object of editing) and nodes of a script or the like. The routing editing process is hereinafter described with reference to FIG. 9. It is to be noted that, upon routing, the type of an attribute (field), for example, SFBool (field including a single theoretical value) or the like, must exhibit coincidence between nodes of the routing source and the routing destination.

In the VRML, it is possible to arrange nodes hierarchically. The scene graph editing tool 523 edits a hierarchical structure of models and invisible nodes (script nodes or the like). For the hierarchical structure of nodes, a structure wherein, for example, a VRML file F1 indicating a leaf, a VRML file F2 indicating a branch, a VRML file F3 indicating a trunk and a VRML file F4 indicating a route are hierarchies below a VRML file F5 indicating a tree can be exhibited as a concrete example.

If a user selects a predetermined VRML file as an object of editing at present, then the scene graph editing tool 523 displays nodes referred to by the selected VRML file in the form of a tree (scene graph) in a scene graph window 76 (refer to FIG. 4). A set of nodes referred to by a VRML file of an object of editing in this manner is referred to as file scope (or current scope). The scene graph editing tool 523 limits a node which makes an object of editing such as routing, production of a key frame, production of a script or the like to a file scope displayed in the scene graph window 76. Further, contents of a file scope and nodes which make an object of editing are changed, in response to changing of a VRML file of an object of editing by the user, to nodes which are referred to by the VRML after the change.

The text editor 524 has an editor function of a programming language suitable for production of a script such as the Java language, and performs production of a source program of a script and automatically performs addition, deletion and variation of a variable in response to an editing operation for a script node.

The template production tool 525 is a tool which is used to provide a user with facilities, and operates in association with the text editor 524 to interactively produce a program (template) which makes the original form of a script in response to an operation of the user for a window called "Script Expert" displayed on the display unit 35 and output the program to the text editor 524. With the template production tool 525, the user can produce a script readily by suitably modifying a source program (a model of a script) in accordance with the necessity, provided by the template production tool 525 and finished to some degree.

The key frame editing tool 526 produces animation with which the condition of a model (for example, the coordinates of a model) edited with the model editing tool 521 varies on a screen.

The scene graph database 53 stores data produced by the tools of the editing tool 52 into the RAM 33 of FIG. 2 and manages the data such that it provides, in response to a request from any of the components of the editing tool 52 and the working tool 54, the stored data at a high speed to the component.

The working tool 54 provides the user with functions necessary for contents production operations such as confirmation of produced contents, confirmation of operation of a script, recording and reproduction of data and so forth.

In the working tool 54, the browser emulator 541 is used to allow the user to confirm operation of produced contents. The browser emulator 541 is started when a "Play" button (which will be hereinafter described) provided in an inputting image displayed on the display unit 35 is operated, and displays contents stored in the scene graph database 53 in a modeling window of the screen of the display unit 35 and further varies the displayed contents in response to an operation of the user.

In short, the browser emulator 541 emulates operation of the browser 57 and indicates, to the user, the same contents as those when the browser 57 is used. It is to be noted that the browser emulator 541 stops its operation when a "Stop" button (which will be hereinafter described) provided in the inputting image or the like is operated, and in response to this, the user interface unit 51 displays the original inputting image.

The file inputting/outputting section 542 records graphics data [a VRML file (extension: .wrl)] of contents stored in the scene graph database 53, a script (extension: java), a texture file (extension: .bmp, .jpg, .gif) or a sound file (extension: .wav, .mod) into the storage unit 39 or onto the recording medium 6. On the contrary, the file inputting/outputting section 542 outputs various data of contents read out from the storage unit 39 or the like to the scene graph database 53.

In the VRML, one scope (a name applied to a node and a range within which routing is possible) is provided for each file (extension: .wrl) of graphics data, and management of node names and routing is performed in units of a scope. The file scope management section 543 performs management of node names of the scene graph database 53, automatic production of a node name and retrieval of a node, and propagates, when a node refers to a plurality of same graphics data files, the modification to the graphics data files to all of nodes to be referred to.

When the browser emulator 541 displays a scene which allows interactive operation, the condition of a node is varied in response to an operation by the user, and therefore, if no countermeasure is taken, then the display of the original scene cannot be restored. Therefore, the backup restore section 544 receives from the scene graph database 53 and stores initial states of each node of a scene (three-dimensional imaginary space produced from an VRML file) displayed first in a modeling window when the browser emulator 541 is started in response to an operation of the Play button.

Further, the browser emulator 541 outputs, when it stops its operation in response to press of the Stop button, stored states of each node to the scene graph database 53. It is to be noted that the user interface unit 51 displays a three-dimensional imaginary space in the modeling window based on initial states of each node inputted to the scene graph database 53.

The script production section 56 has a function of compiling a script produced by the user using the text editor 524, an operation confirming function and a debugging function.

In the script production section 56, the Java compiler 561 compiles a source program of a script by the Java language stored in the scene graph database 53 to produce an object program and outputs the object program to the scene graph database 53.

The Java emulator 562 and the Java debugger 563 operate as an interpreter of a program described with the Java language and is used to allow the user to confirmation of operation and debugging of a script program. In short, the Java emulator 562 emulates operation of an object program of a script stored in the scene graph database 53, and the Java debugger 563 outputs a state of the Java emulator 562 upon emulation operation and an error which has occurred to the scene graph database 53.

The browser 57 is an improvement over, for example, a browser which is used to browse the ordinary WWW in that it is suitable to display a three-dimensional imaginary space, and causes the display unit 35 to display contents of a three-dimensional imaginary space read out from the storage unit 39 or contents of a three-dimensional imaginary space transmitted from the server 12 of FIG. 1 through the network. Further, the browser 57 causes the display unit 35 to display a help file in association with an operation of any of the components of the user interface unit 51, editing tool 52, scene graph database 53 and working tool 54. It is to be noted that, for the browser 57, the "Communication Place (trademark) Browser" provided by the assignee of the present patent application can be used.

In the following, characteristic functions of the contents production tool 50 are described. If the user presses the Play button (which will be hereinafter described with reference to FIG. 5) displayed in a window in the screen of the display unit 35 using the mouse 38b, then the browser emulator 541 executes contents which have been produced by then and displays the contents (operation confirmation function). This function eliminates a time required to start the browser 57 for confirming operation of the produced contents after the contents are stored once, and besides allows the user to confirm operation of the contents, which have been produced by the operation till then, at an arbitrary timing during the contents production operation.

If the user presses the Play button in order to confirm operation, the Java compiler 561 automatically compiles a source program of a script (for example, a file having the extension ".java") and produces an object program (MAKE function).

The backup restore section 544 stores a condition of the contents and a viewpoint of the user upon starting the operation confirmation so that, when the browser emulator 541 stops its execution of the contents as the user presses the Stop button displayed in the window in the screen of the display unit 35 using the mouse 38b, the contents are returned to the condition same as that upon starting the operation confirmation to return the displayed contents of the models and the viewpoint of the user to the conditions same as those upon starting the operation confirmation (backup restore function).

The user can use the text editor 524 to produce a source program of a script in a language suitable for script production such as the Java language and compile the produced source program using the Java compiler 561 to produce an object program (production of a script program). This object program is executed not only when the contents are operated by the browser 57, but also when confirmation of operation is performed by the browser emulator 541. Further, if a debug code is additionally provided to the source program and the source program is executed by the Java emulator 562, the Java debugger 563 can display input/output values of the script and so forth, so that a debug operation of the script can be performed (debugging function).

After the user sets input/output values of script nodes in an interactive fashion, the template production tool 525 produces a template of a source program of the script suitable for the setting (automatic template production function). The user can produce a source program of the script which realizes a desired event by suitably modifying the template using the text editor 524. Due to this function, the user can eliminate the time and work required to produce a source program of the script entirely by an editor and besides can prevent occurrence of a simple coding miss.

FIG. 4 shows a menu screen which is displayed on the display unit 35 (FIG. 2) by the user interface unit 51 of the contents production tool 50. While, in the menu screen shown, all windows are shown, it is possible, of course, to display only necessary windows.

Referring to FIG. 4, a conductor window 70 is used to perform general management of the contents production tool 50 and allows new production, reading in, save, execution of a confirmation operation of produced contents or stopping of a confirmation operation. The conductor window 70 further allows switching of a mouse mode, addition of a model or deletion of a model, and so forth.

In a 3D view window 71, a three-dimensional perspective view (3D perspective view) of an object corresponding to produced graphics data is displayed. The 3D view window 71 allows variation of an operation mode of a model (rotation or movement of the model, or movement of the viewpoint) or display of an image of a selected model after being rotated or moved.

In a parallel view window 72, a side view (SideView), a top view (Top View) or a view by a wire frame (Wireframe) of a model displayed in the 3D view window 71 are displayed two-dimensionally.

A route window 73 is used to edit routing of an event (which will be hereinafter described with reference to FIG. 6).

An attribute window 74 is used to set an attribute of a node for which routing is to be performed and a node name (DEF name) of the node. It is to be noted that setting of a DEF name can be performed alternatively using the scene graph window 76 and the route window 73. This will be hereinafter described.

A resource library window 75 is used to perform management of four libraries of the moving pictures (Video), shapes of graphics forms (Shape), sound (Sound) and textures (Texture).

In a scene graph window 76, nodes of a current scope are displayed in a hierarchical arrangement.

A world information window 77 is used to perform setting of three nodes of a background (Background) node, a world information (Worldinfo) node and a navigation information (Navigationinfo) node. In the world information window 77, in setting of a background node, a texture of the background and a background color can be set; in setting of world information, a title, a name of a producing person, a date of production and so forth can be set to a VRML file; and in setting of a navigation mode, an operation upon navigation can be set.

An appearance window 78 is used to perform setting of a color of a model (Material) or a texture to be applied to a model.

A script editor 79 is used to edit a VRML file or a Java file, and also it can compile a Java program.

Figure 5:
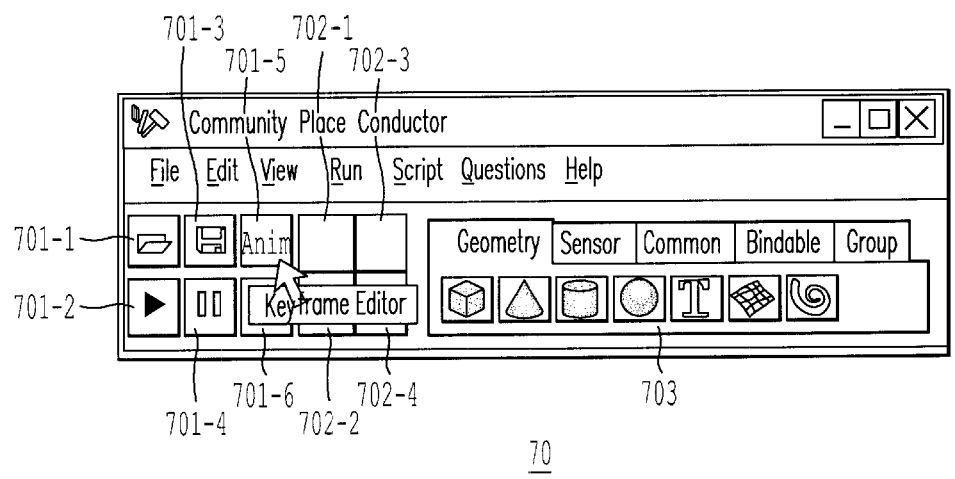
FIG. 5 is a photograph of a half tone image showing an example of a display of a conductor window shown in FIG. 4 on the display unit.

FIG. 5 shows an example of a construction of the conductor window 70 of FIG. 4. A button (File button) 701-1 is operated, for example, to read in contents stored as a file in the storage unit 39. A button (Play button) 701-2 is operated to execute a confirmation operation of produced contents (simulation mode). A button (Save button) 701-3 is operated to store contents, for example, into the storage unit 39. A button (Pause button) 701-4 is operated to temporarily stop a confirmation operation being executed. A button (Anime button) 701-5 is operated to start a key frame editor (KeyFrame Editor) for producing animation or to end a key frame editor being operated. A button (stop button) 701-6 is operated to stop a confirmation being executed.

Buttons 702-1 to 702-4 are used to set a mouse mode. The button (Navigator button) 702-1 is used to set a mode for moving the viewpoint in the parallel view window 72 or the 3D view window 71. The button (Rotate button) 702-2 is operated to set a mode for rotating a model. The button (Move button) 702-3 is operated to set a mode for moving a model. The button (Scale button) 702-4 is operated to set a scale of a model.

A primitive bar 703 is used to select and add a geometry (Geometry) node, a sensor (sensor) node, a common (Common) node, a bindable (Bindable) node or a group (Group) node.

Figure 6:
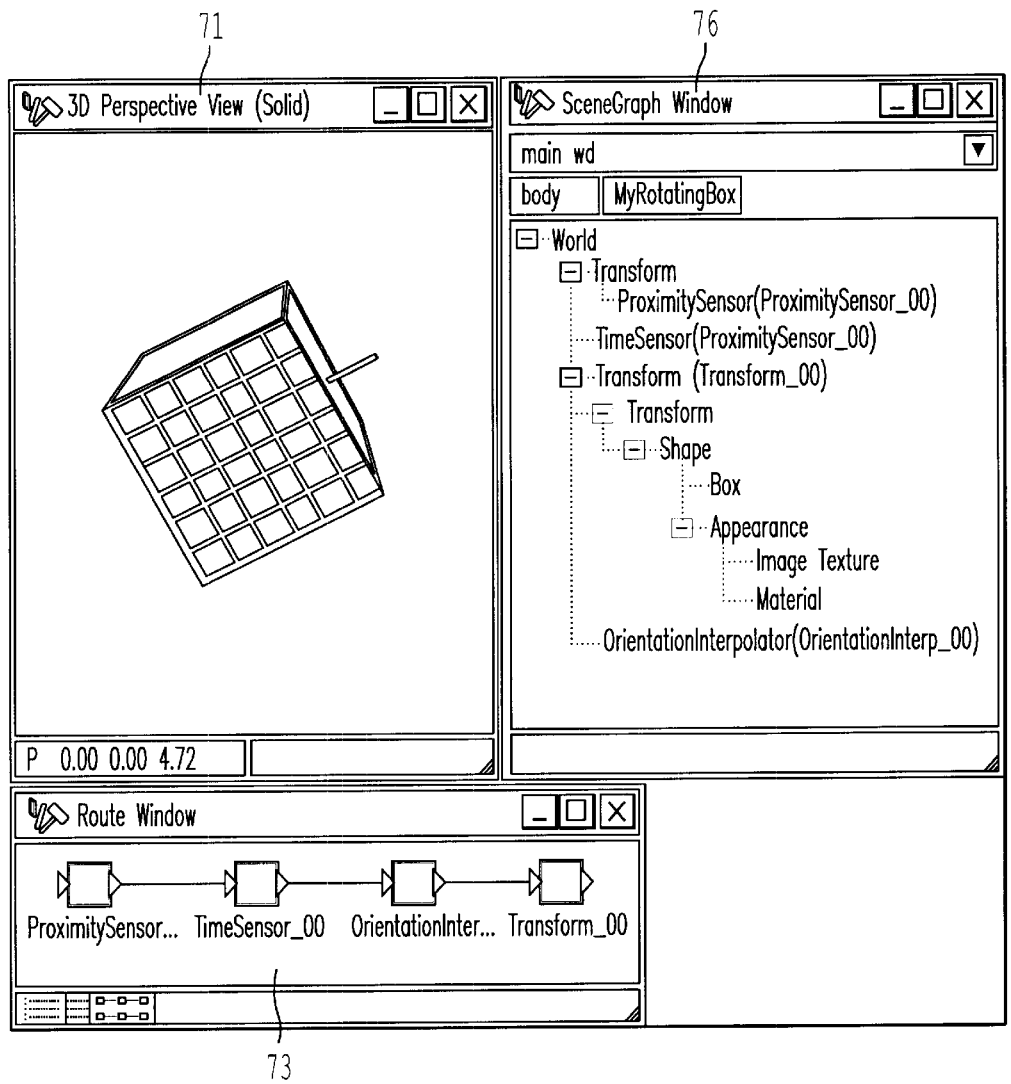
FIG. 6 is a photograph of a half tone image showing an example wherein a 3D view window, a route window and a scene graph window are displayed simultaneously on the display unit.

FIG. 6 shows an example of a display where the 3D view window 71, the route window 73 and the scene graph window 76 are arranged simultaneously in a juxtaposed relationship. Referring to FIG. 6, in the example shown, a world that a model (Box) rotates when the user (viewer) approaches the Box is displayed as a current scope in the scene graph window 76. In this world, principally a ProximitySensor node (ProximitySensor$_{13}$ 00: DEF name) which is a sensor node for a degree of proximity, a TimeSensor node (TimeSensor_00: DEF name) which is a sensor node regarding the time, and an OrientationInterpolator node (OrientationInterpolator_00: DEF name) which is an interpolation node for a direction are used. In the route window 73, routes from the ProximitySensor_00 node to the TimeSensor_00 node, from the TimeSensor node to the OrientationInterpolator node and from the OrientationInterpolator node to the Transform node are produced. It is to be noted that, since this world is not produced particularly taking a hierarchical structure into consideration, in the present example, the TimeSensor node and the OrientationInterpolator node are placed at the top of the scene graph displayed in the scene graph window 76 as shown in FIG. 6.

Figure 7:
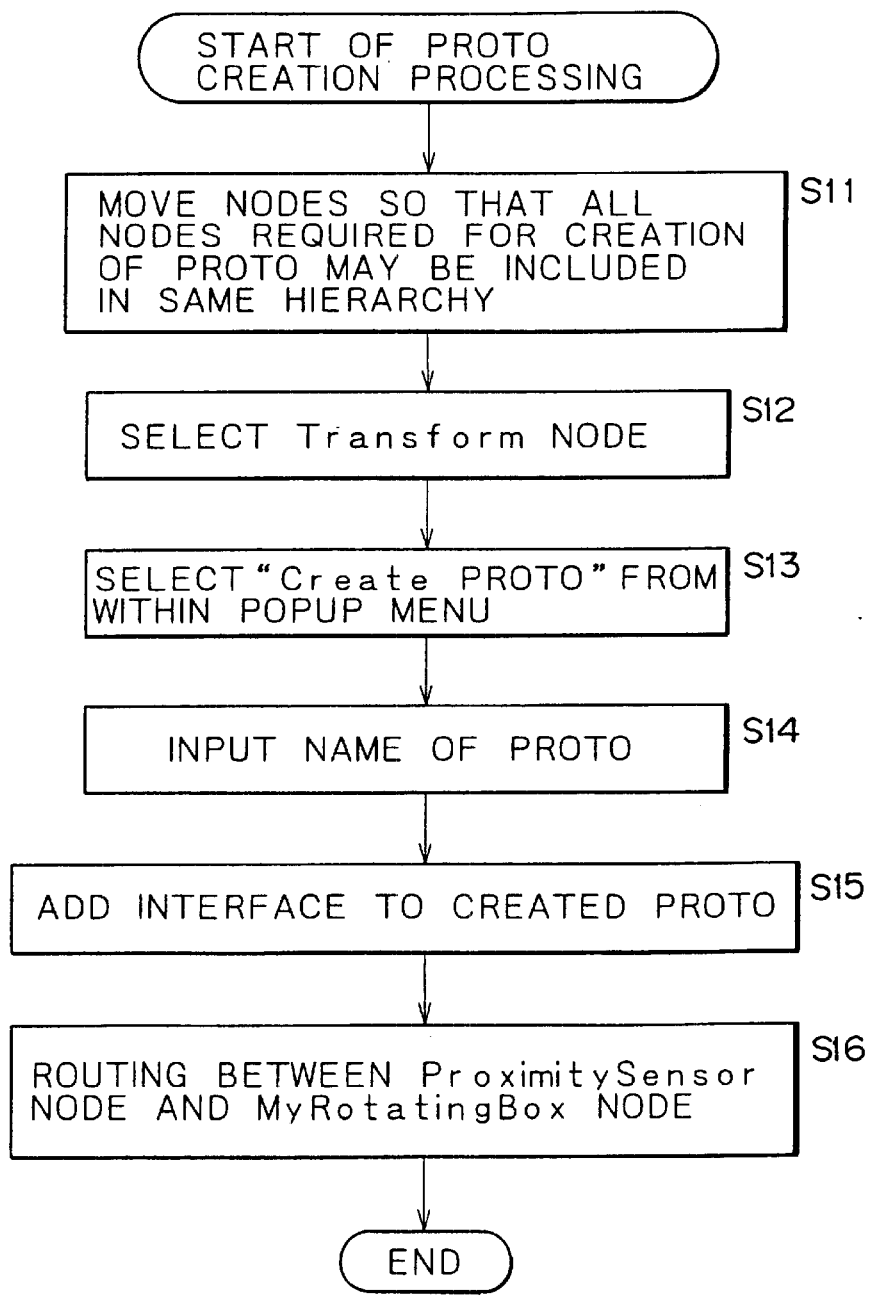
FIG. 7 is a flowchart illustrating a process for production of a prototype PROTO.

Here, a process of creating a prototype (PROTO) using some nodes from among the nodes which compose the world described above is described with reference to the flowchart of FIG. 7. In order to create a PROTO, nodes necessary for definition must all be included in the same group. In other words, the nodes of the group to be defined as a PROTO must all be included in the same hierarchy on the scene graph. Now, attention is paid to the Transform_00 node below which the Box is grouped. In this instance, however, the TimeSensor node and the OrientationInterpolator node are not included in a hierarchy below the Transform_00. Therefore, if nodes in a hierarchy or hierarchies below the Transform_00 node are defined as a PROTO, the TimeSensor node and the OrientationInterpolator node are not included in the PROTO.

Figure 8:
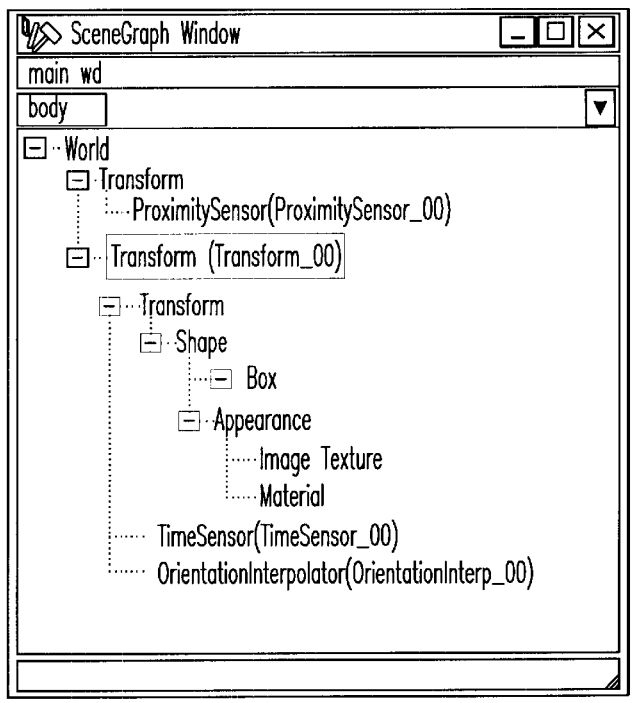
FIG. 8 is a photograph of a half tone image showing an example wherein the scene graph window of FIG. 6 is displayed on the display unit.

Therefore, in step S11, the user will move nodes which are necessary for production of a PROTO, using the mouse 38*b*, for example, on the scene graph displayed in the scene graph window 76 so that they may be included below the Transform_00 node as shown in FIG. 8. In the present case, the TimeSensor node and the OrientationInterpolator node are moved so that they may be included in a hierarchy or hierarchies below the Transform_00 node. It is to be noted that, even if movement of the nodes is performed on the scene graph in this manner, the condition of the routing among the nodes does not vary.

Then in step S12, the user will designate the Transform_00 node, which is the node of the highest hierarchy of the group defined as a PROTO, using the mouse 38*b*, for example, to establish a selected condition of the Transform_00 node (displayed in a reversed condition) (FIG. 8). In this instance, the display in the route window 73 changes from a condition illustrated in FIG. 9A to another condition illustrated in FIG. 9B. In particular, any node which is dependent on the selected node is fade-out displayed. In the present case, the TimeSensor_00 and the OrientationInterpolator_00 which are dependernt on the Transform_00 nodes, and Transform_00 also are fade-out displayed respectively. Consequently, the user can visually discriminate that the routes move into the produced PROTO, when a PROTO is produced using nodes in a hierarchy or hierarchies below the Transform_00.

Figure 10:
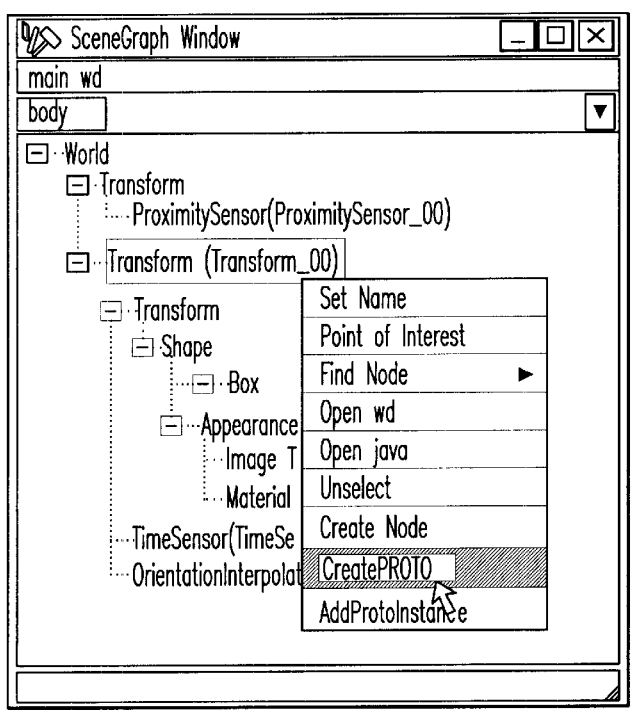
FIG. 10 is a photograph of a half tone image showing an example wherein a popup menu of the scene graph window of FIG. 8 is displayed on the display unit.

In step S13, the user will right click the mouse 38*b*, for example, to cause the scene graph window 76 to display a popup menu as shown in FIG. 10, and select "Create PROTO" which indicates creation of a PROTO from among various functions displayed in the popup menu. Consequently, a PROTO of the nodes below the selected Transform_00 is created. Then, a condition wherein a name of the PROTO is to be inputted is entered, and the user will input a name of the produced PROTO in step S14. It is assumed that, in the present case, the name of "MyRotatingBox" is inputted.

Figure 11:
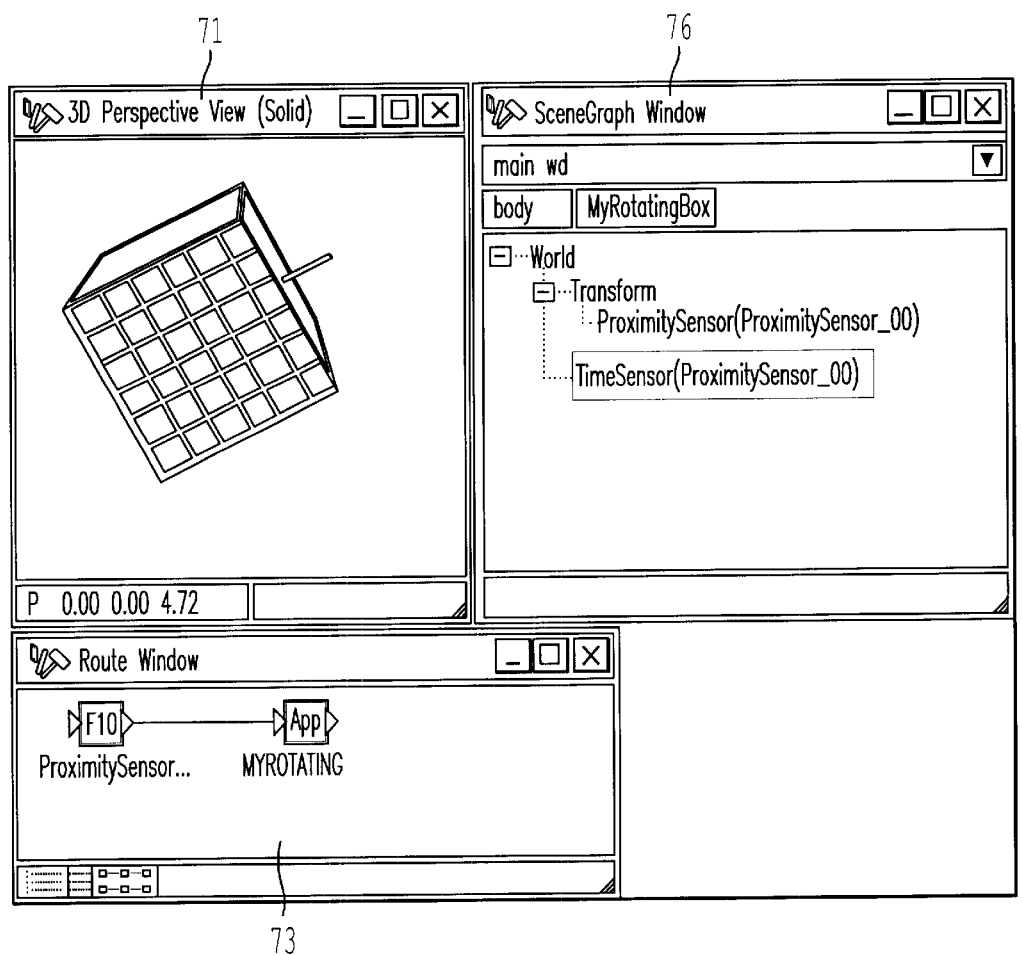
FIG. 11 is a photograph of a half tone image showing an example wherein the 3D view window, the route window and the scene graph window in a condition wherein a keyword PROTO is produced are displayed on the display unit.

A MyRotatingBox node is newly created as a PROTO in this manner, and the MyRotatingBox node to which the DEF name of "MYROTATINGBOX" is applied is displayed on the scene graph of the scene graph window 76 as shown in FIG. 11. By the way, although, before the PROTO is created, the route from the ProximitySensor node to the TimeSensor node has been present as shown in FIG. 9, since the TimeSensor node has moved to the produced MyRotatingBox node, it must be routed between the ProximitySensor node and the MyRotatingBox node. Therefore, in step S15, the editing tool 52 adds an interface as a field for receiving an event from an external node to the newly created PROTO (hereinafter referred to as MyRotatingBox node). Consequently, an event outputted from an external node (in the present case, the ProximitySensor node) can be inputted to the PROTO (MyRotatingBox node) through the interface.

Then in step S16, the editing tool 52 routes the MyRotatingBox node (MYROTATINGBOX) from the ProximitySensor node (ProximitySensor_00). Consequently, in the route window 73 of FIG. 11, a line representing a route is displayed between the icon of the ProximitySensor_00 and the icon of the MYROTATINGBOX.

In this manner, if, when a PROTO is created, there is a node which must be routed to the PROTO, then the editing tool 52 adds an interface which can receive an event from an external node to the created PROTO(or output an event to an external node).

Figure 12:
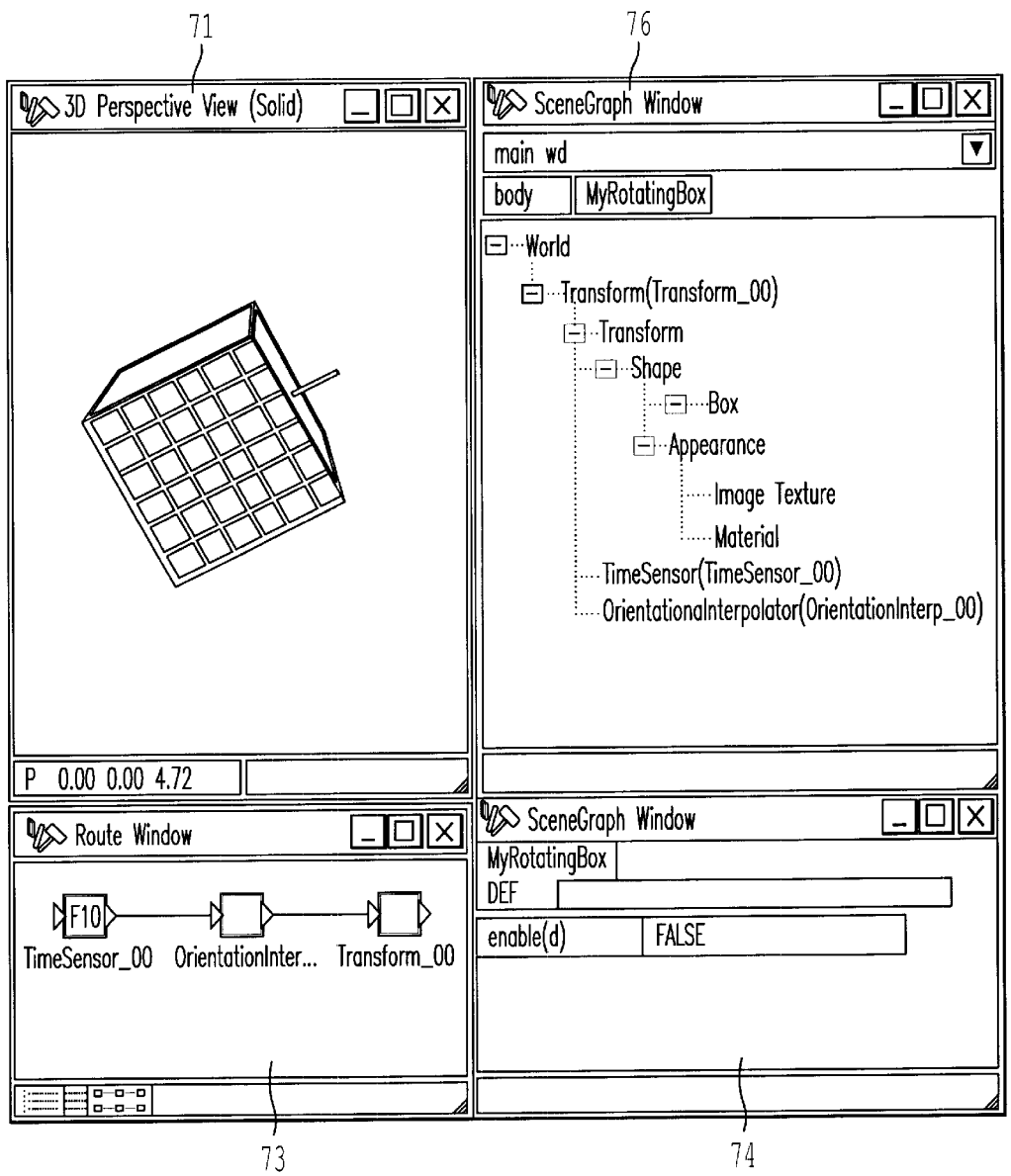
FIG. 12 is a photograph of a half tone image illustrating a condition wherein a tab "MyRotatingBox" is selected in the scene graph window of FIG. 11.

Here, in the scene graph window 76 of FIG. 11, a tab of "MyRotatingBox" is provided newly such that, if the user selects the tab "MyRotatingBox", then contents of the MyRotatingBox node are displayed as shown in FIG. 12. In the present case, it can be seen that the TimeSensor which has been routed to the ProximitySensor in the route window 73 of FIG. 6 has moved into the MyRotatingBox node.

Further, in this instance, the attribute window 74 is displayed as shown in FIG. 12 so that an attribute of the MyRotatingBox node created as the PROTO can be modified. In the present case, a box in which a field (exposedfield) named "enabled" of the MyRotatingBox node can be:set is provided such that an event can be inputted or outputted through the field of "enabled".

Figure 13:
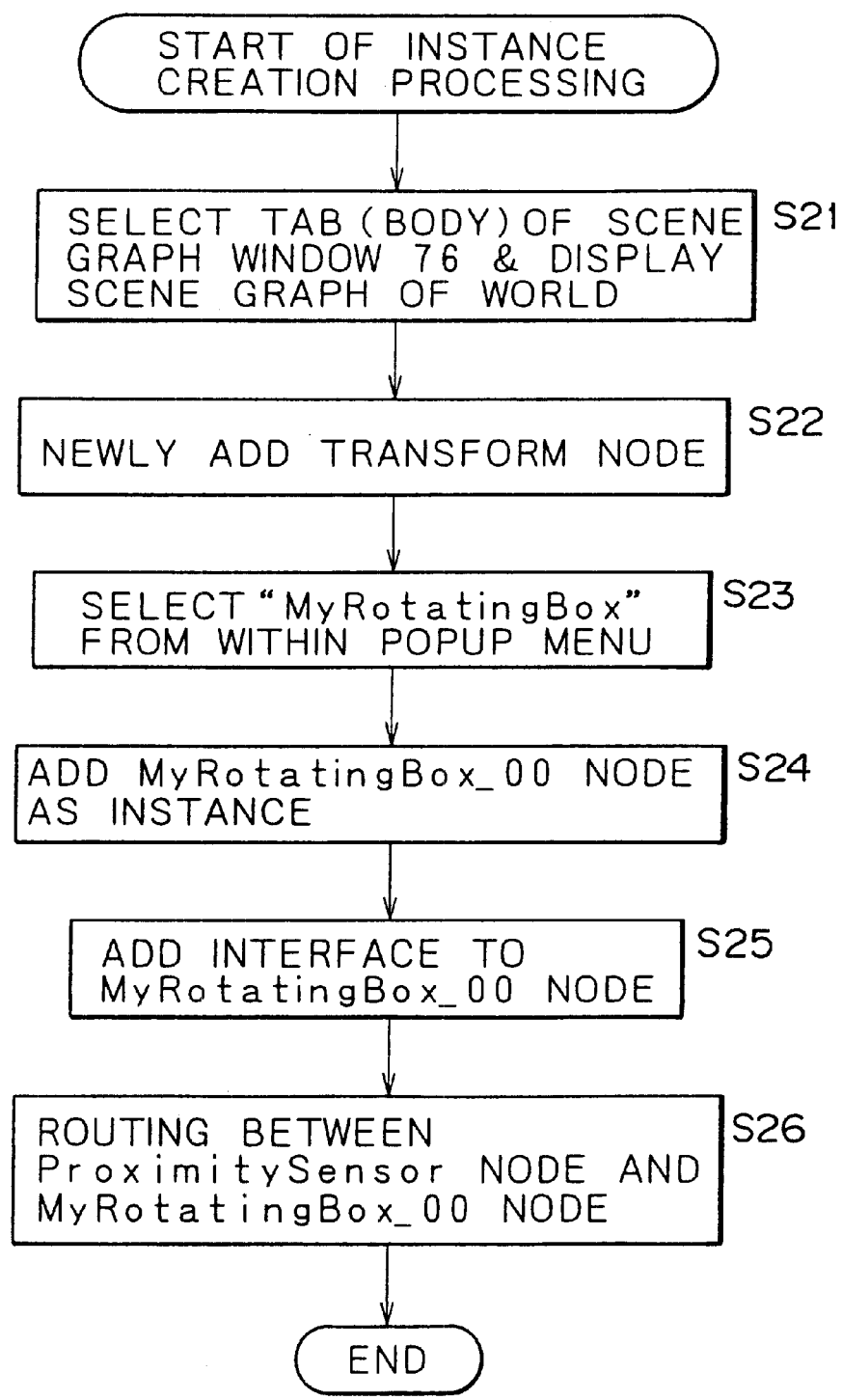
FIG. 13 is a flowchart illustrating a process of producing an instance of the keyword produced in FIG. 7.
Figure 14:
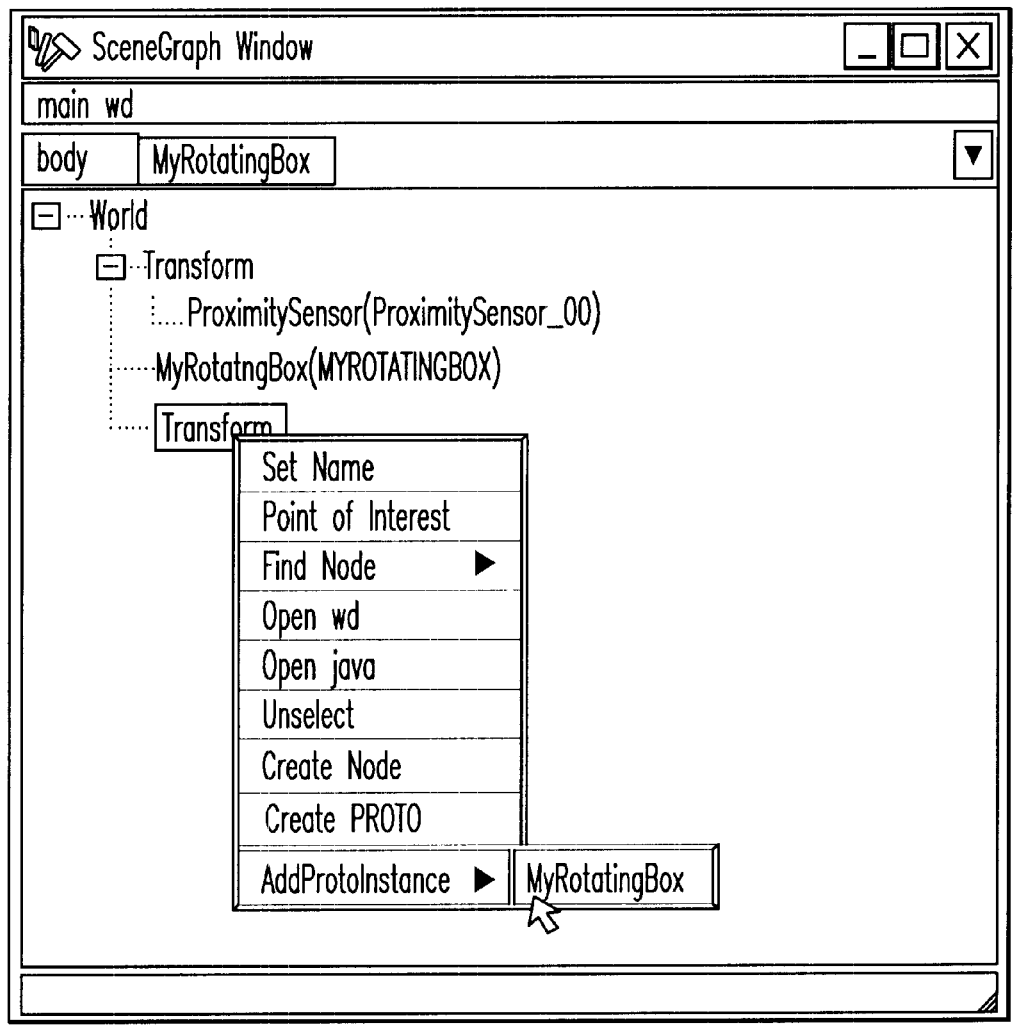
FIG. 14 is a photograph of a half tone image showing an example wherein a popup menu is displayed in the scene graph window on the display unit.
Figure 15:
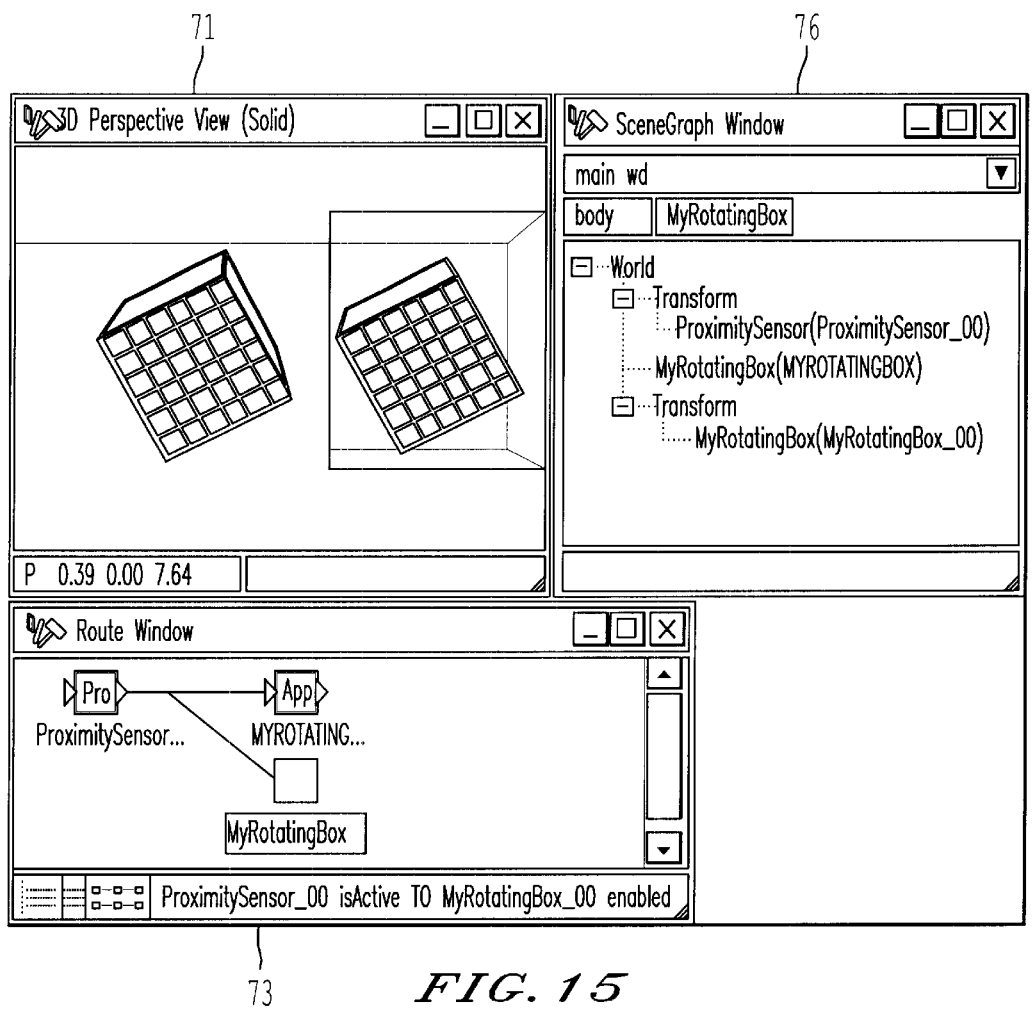
FIG. 15 is a photograph of a half tone image showing an example wherein the 3D view window, the route window and the scene graph window in a condition wherein an instance is produced are displayed on the display unit.

Now, the process of actually creating the MyRotatingBox node which is the created PROTO, as an instance (substance) is described with reference to the flowchart of FIG. 13. First in step S21, the user will select the tab (body) of the scene graph window 76 to cause the scene graph of the world which is a current scope at present to be displayed, and in step S22, the user will newly add the Transform node on the scene graph. In step S23, the user will right click the mouse 38b, for example, in the scene graph window 76 to cause a popup menu to be displayed as shown in FIG. 14, move the mouse pointer to a choice "AddProtoInstance", which indicates addition of an instance of the PROTO, in the popup menu and select another choice "MyRotatingBox" displayed on the right side of the choice "Add ProtoInstance". Then in step S24, the editing tool 52 adds the instance of the MyRotatingBox node as the MyRotatingBox_00 to the scene graph of the scene graph window 76. Further, as shown in FIG. 15, a Box corresponding to the added instance is displayed in the 3D view window 71.

In step S25, the editing tool 52 adds an interface for receiving an event from the ProximitySensor to the MyRotatingBox_00 which is the added instance, and in step S26, the editing tool 52 produces a route from the ProximitySensor to the MyRotatingBox_00 node in the route window 73. Consequently, the added instance receives an event outputted from the ProximitySensor and rotates when the field (enabled) becomes ture.

In this manner, also when an instance of a produced PROTO is added, where a node to be routed to the instance is present, the editing tool 52 automatically adds an interface to effect routing.

Figure 16:
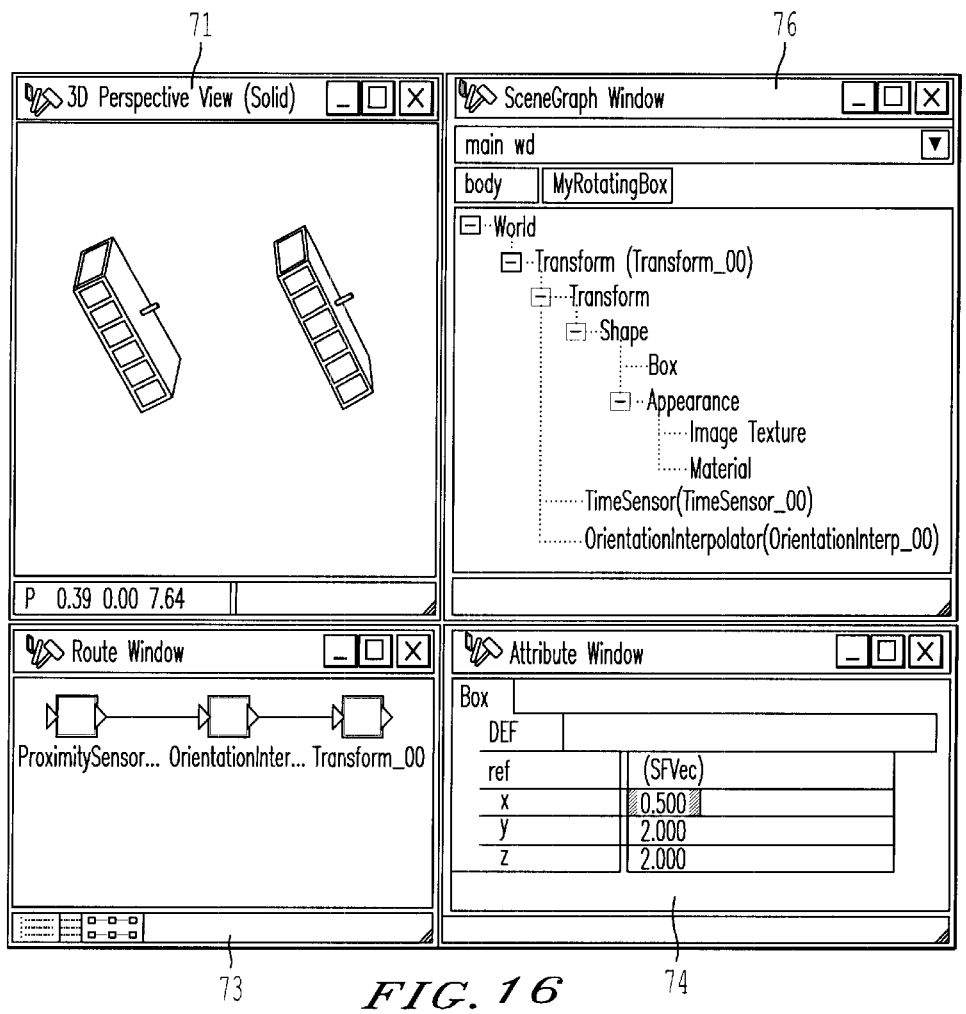
FIG. 16 is a photograph of a half tone image illustrating a condition wherein the value of "x", indicative of the size of an attribute in the direction of the X axis is set to 0.5.

Then, if the Box node of the tree of the MyRotatingBox node displayed as a result of selection of the tab of "MyRotatingBox" of the scene graph window 76 is designated, for example, by the mouse 38b to put the Box node into a selected condition (reversed display condition), also the Box displayed in the 3D view window 71 is put into a selected condition. Then, if the value of "x" indicative of the size of the attribute of the Box in the direction of the X axis is set, for example, to 0.5, which is one fourth the value of the size of the Y axis and the z axis as shown in FIG. 16, the sizes of the two Boxes displayed in the 3D view window 71 in the direction of the X axis are both reduced to one fourth as shown in FIG. 16. In this manner, a modification to an attribute of the PROTO is reflected also on the instance of the PROTO.

It is to be noted that, while, in the foregoing description, a PROTO is created using some of nodes which form a world displayed as a current scope, also it is possible to produce a PROTO of all of the nodes (that is, the entire world).

It is to be noted that the computer program which provides such various processes as described above can be provided to a user through a recording medium such as a CD-R, a CD-ROM or a floppy disc or provided to a user through a providing medium such as a network so that, when necessary, the computer program may be recorded onto and utilized together with a built-in RAM or hard disc.

While preferred embodiments of the present invention have been described using specific terms, such description is for illustrative purpose only, and it is to be understood that changes and variations may be made without departing from the spirit or scope of the following claims.

What is claimed is:

1. An information processing apparatus which hierarchically displays nodes, which form a world, as a current scope and defines a new node as a prototype using some or all of the nodes of the hierarchically displayed current scope, comprising:

addition means for adding, when the prototype is defined using some of the nodes of the current scope, if the current scope includes a node which should be routed to the prototype, an interface as a field for inputting or outputting an event therethrough to the prototype; and routing means for routing between said node and said prototype through said interface added by said addition means.

2. An information processing apparatus according to claim 1, further comprising creation means for creating an instance which is a substance of the prototype, second addition means for adding an interface to said instance when the current scope includes a node which is to be routed to said instance created by said creation means, and second routing means for routing between said node and said instance through said interface added by said second addition means.

3. An information processing apparatus according to claim 2, wherein, when an attribute of the prototype is varied, the variation is reflected also upon an attribute of said instance.

4. An information processing method wherein nodes which form a predetermined world are hierarchically displayed as a current scope and a new node is defined as a prototype using some or all of said nodes of the hierarchically displayed current scope, comprising:

an addition step of adding, when said prototype is defined using some of the nodes of said current scope, if said current scope includes a node which should be routed to said prototype, an interface as a field for inputting or outputting an event therethrough to said prototype; and a routing step of routing between the node and the prototype through said interface added by the addition step.

5. A providing medium for providing a computer program which can be read and executed by an information processing apparatus, which hierarchically displays nodes, which form a predetermined world, as a current scope and defines a new node as a prototype using some or all of the nodes of the hierarchically displayed current scope, to execute:

an addition step of adding, when said prototype is defined using some of the nodes of said current scope, if said current scope includes a node which should be routed to said prototype, an interface as a field for inputting or outputting an event therethrough to the prototype; and a step of routing between the node and the prototype through said interface added by said addition step.

* * * * *